(12) United States Patent
Lipton et al.

(10) Patent No.: US 8,279,272 B2
(45) Date of Patent: Oct. 2, 2012

(54) AUTOSTEREOSCOPIC DISPLAY WITH PLANAR PASS-THROUGH

(75) Inventors: Lenny Lipton, Los Angeles, CA (US); Robert Akka, Sausalito, CA (US); Jerilynn Schisser, Petaluma, CA (US); Mark H. Feldman, Walnut Creek, CA (US)

(73) Assignee: RealD Inc., Beverly Hills, CA (US)

( * ) Notice: Subject to any disclaimer, the term of this patent is extended or adjusted under 35 U.S.C. 154(b) by 1597 days.

(21) Appl. No.: 11/400,958

(22) Filed: Apr. 7, 2006

(65) Prior Publication Data

US 2006/0284974 A1 Dec. 21, 2006

Related U.S. Application Data

(60) Provisional application No. 60/669,818, filed on Apr. 8, 2005.

(51) Int. Cl.
*H04N 13/02* (2006.01)
(52) U.S. Cl. ......................................................... 348/59
(58) Field of Classification Search ..................... 348/59
See application file for complete search history.

(56) References Cited

U.S. PATENT DOCUMENTS

| | | | |
|---|---|---|---|
| 3,409,351 A | 11/1968 | Winnek | |
| 5,537,144 A * | 7/1996 | Faris | 348/58 |
| 6,157,424 A | 12/2000 | Eichenlaub | |
| 6,850,210 B1 | 2/2005 | Lipton et al. | |
| 2004/0263971 A1 * | 12/2004 | Lipton et al. | 359/463 |
| 2005/0030301 A1 * | 2/2005 | Harrold et al. | 345/204 |

OTHER PUBLICATIONS

Liao et al. 'High Quality Autostereoscopic Surgical Display Using Anti-aliased Integral Videography Imaging', Graduate School of Information Science and Technology, The university of Tokyo, pp. 462-446, 2004.*
Moller et al. 'Correcting Interperspective Aliasing in Autostereoscopic Displays', IEEE Transactions on Visualization and Computer Graphics, vol. 11, No. 2, pp. 228-236, Mar./Apr. 2005.*
Moller et al, Correcting Interperspective Aliasing in Autostereoscopic Displays IEEE Transactions on Visualization and Computer Graphics, vol. 11, Issue2 Mar. 2005, pp. 2228-2236.
Liao et al, High Quality Autostereoscopic Surgical Display Using Antialiased Integral Videography Imaging, Medical Image Computing and ComputerAssisted Intervention MICCAI 2004.
European Application No. EP 06 74 9652, Supplementary European Search Report dated Nov. 13, 2009.

* cited by examiner

*Primary Examiner* — Joseph Ustaris
*Assistant Examiner* — Anner Holder
(74) *Attorney, Agent, or Firm* — Baker & McKenzie LLP (57) ABSTRACT

A method and system for presenting both autostereoscopic images and planar images in a single display is disclosed. The design comprises processing the planar images received in the form of planar image data. The processing comprises at least one from a group comprising selectively employing bleed-through processing to enhance the planar image data when viewed through a lens sheet comprising slanted lenticules, selectively introducing blurring into the planar image data, and selectively employing anti-alias processing to the planar image data. Certain super pixels may be computed that differ from standard pixels, and lenticules in the data sheet may be slanted at desired angles. The physical lenticules may cause bleed-through that may be processed. Resolution may be computed after processing, and the resolution implemented for display. Mode switching between planar and autostereoscopic imaging may be provided in the form of Metadata or visible flags.

19 Claims, 9 Drawing Sheets

AUTOSTEREOSCOPIC DISPLAY WITH PLANAR PASS-THROUGH

This application claims the benefit of U.S. Provisional Patent Application Ser. No. 60/669,818, "Autostereoscopic Display with Planar Pass-Through," filed Apr. 8, 2005.

BACKGROUND OF THE INVENTION

1. Field of the Invention

The present invention relates generally to the art of electronic autostereoscopic flat panel displays and more specifically to producing high quality moving images in both in the stereoscopic and planar (non-stereoscopic) modes on an electronic autostereoscopic flat panel display.

2. Description of the Related Art

An autostereoscopic display, in particular the kind using a microlens array in order to be of general usefulness, must function in both the autostereoscopic and planar modes. The problem that faces the designer is that the microlens array, with its multiplicity of refractive elements, while producing an autostereoscopic image in association with properly encoded or mapped data, will reduce the effective resolution of the display when planar data is viewed. The usefulness in the planar mode is so compromised that performance is unacceptable.

As used herein, the terms "lens sheet," "lenticular screen", or "lens screen" are used synonymously, and an individual microlens element is sometimes called a lenticule, lenticle, or a lenslet.

In the current state of autostereoscopic displays, a need exists for applications such as autostereoscopic digital signage. Such a design would preferably produce a good quality planar result, allowing the owner of such digital signage equipment to play her legacy planar content. In addition, a computer desktop monitor configured appropriately can be used for typical planar applications such as word processing, and also used for autostereoscopic visualization applications. The technology can be applied to a television receiver so that current planar content can be enjoyed at one moment, and at the next, autostereoscopic images may be viewed without the user having to lift a finger.

Certain assumptions are made throughout this disclosure. First, the disclosure assumes the use of a flat panel, typically a liquid crystal or a plasma display, but other types are also to be considered without any loss of generality, such as organic light-emitting diodes. And, although this discussion assumes the use of a refractive microlens array, this disclosure also applies to a raster barrier selection device.

Certain designers have suggested features that would allow an autostereoscopic display to function equally well in both the autostereoscopic mode and the planar mode. The most obvious is to use a removable microlens array. Such an array is a flat sheet made up of a multiplicity of lenslets, and can usually be removed from its position in intimate contact with the display surface. One concern with this approach is achieving proper juxtaposition of the array with respect to the underlying display. Once returned to the display surface, each lens element must be precisely aligned with its associated sub-pixel. In addition, many users find storing the lens sheet inconvenient. Both storage and alignment are factors of concern, and the solution is somewhat inelegant.

A method for overcoming the alignment concerns raised by the removable lens sheet approach involves the use of a supplemental refractively neutralizing lens sheet which has negative-going or convex shaped lenslets which, when placed in juxtaposition with the primary lens sheet, neutralize the effects of the lens sheet. The benefit of this approach is that there are no alignment issues with regard to the primary microlens array. However, the process of placing and removing the lens sheet is hardly transparent to the user and generally inconvenient.

Yet another solution is an electro-optically switchable lens sheet. Such a lens sheet is able to turn on and off the refractive properties of the lenticules using a specially designed liquid crystal cell. The lenticules are formed on the inside of the cell. The refractive properties of the cell may be neutralized by electro-optically changing the refractive property of the liquid crystal material. Such an elegant approach involves the use of two liquid crystal displays, the variable electro-optical microlens array itself and the image forming display. Such an arrangement will substantially increase the cost of the product, but if properly implemented and realized, such a design can be transparent to the user.

The manufacturer Sharp Electronics Corporation produces autostereoscopic display products using two liquid cells. The selection device in certain Sharp products lies between the display proper and the light source and forms a switchable inverted raster barrier device. The liquid crystal shutter forms parallel ruling that is turned on or off in the autostereoscopic and planar modes respectively. In present designs, the Sharp device uses only two views and suffers from a tiny viewing zone, which is very undesirable. The Sharp design uses two liquid cells in optical series, has the disadvantage of increased cost, and suffers from reduced brightness.

These solutions, and others like them, have been proposed in the literature because designers have sought a display that functions in both in the autostereoscopic and the planar modes and exhibits excellent overall viewing characteristics and ease of use. For the reasons given above, previously available displays may not be entirely practical in terms of price and performance.

Such a display may well be used with a desktop PC, in which case the microlens array will need to pass through fine text and icons. For example, a minimum resolution requirement for a decent quality desktop monitor is on the order of 1080×1024 pixels, at a minimum. Certain users may not be happy with this and would require something more like 1280×1024 pixels, or higher. In the realm of the home television, the maximum display requirement is 1920×1080 to conform to the highest quality HDTV mode.

It would therefore be desirable to offer an autostereoscopic display capable producing both a high quality autostereoscopic image and a high quality planar image that overcomes the design issues associated with previous designs. Such a design may minimize user effort and may be realized at lower cost.

SUMMARY OF THE INVENTION

According to one aspect of the present design, there is provided a method for presenting both autostereoscopic images and planar images in a single display. The method comprises processing the planar images received in the form of planar image data. The processing comprises at least one from a group comprising selectively employing bleed-through processing to enhance the planar image data when viewed through a lens sheet comprising slanted lenticules, selectively introducing blurring into the planar image data, and selectively employing anti-alias processing to the planar image data.

These and other advantages of the present invention will become apparent to those skilled in the art from the following detailed description of the invention and the accompanying drawings.

DETAILED DESCRIPTION OF THE INVENTION

The present design comprises a combination of optical and software techniques providing a low cost device for passing a high quality planar image through the microlens array of an autostereoscopic display. The transition from one mode to the other will be automatic and transparent to the user. As used in this description, the technology to pass a quality image to the user is called "planar pass-through" or simply "pass-through."

Any flat panel display has a "native resolution", by which is meant the actual pixel count in the horizontal and vertical dimensions. Flat panel displays, unlike their CRT precursors, have a fixed resolution capability and rely on image scaling in order to match a variety of resolution images to the display. The microlens array serves to modulate the native resolution of the flat panel display, while enabling stereoscopic capability, effectively reducing resolution for planar applications.

The lenslets of the microlens array or lens sheet are of a well known design: they are typically cylindrical lenslets, such as those described by Lipton et al. in U.S. Pat. No. 6,850,210, "Parallax Panoramagram Having Improved Depth and Sharpness." Indeed, as noted above, the selection device could be of a raster barrier design without loss of generality. The lens sheet modulates the characteristics of the light rays emerging from the display panel because of its multi-faceted refractive properties, and in the planar mode the resulting resolution is consequently reduced. The present design seeks to mitigate this reduction in resolution. One aspect of the design comprises a monitor with high enough native resolution so that, after applying appropriate optical and software techniques, a desired planar resolution pass-though can be achieved. This is only one part of the total solution.

One other part of the solution, specifically for the SynthaGram™ product, manufactured by StereoGraphics Corporation, is achieved by turning on or off the Interzig algorithm in the SynthaGram™. This algorithm employed in the SynthaGram™ maps multiple perspectives by selecting or sampling pixel elements of each perspective view and arranging these in a form that coincides with or corresponds to the requirements of a particular microlens array. Interzig is StereoGraphics' proprietary algorithm for what has been known variously and generically in the literature as interdigitation, interlacing, or interleaving.

Rather than transmit a mapped autostereoscopic image, the present design transmits the separate perspective views in one file following a specific format protocol. In the case of the SynthaGram™, the system transmits nine perspective views in what is called the "Nine-Tile format". These nine perspective views, when viewed on a planar monitor, look like a tic-tac-toe arrangement of views. This arrangement has the virtue of being compressible while preserving perspective information. Once the image is Interzigged it cannot be compressed by any known means. Therefore the Nine-Tile format promotes transmission and movie playback. The SynthaGram™ Player, the device that plays the Interzigged image or images, is based on Microsoft's Direct Show technology. This architecture allows for handling of Nine-Tile content in a wide range of file formats and compression schemes. The Player also uses the DirectX graphics Application Programming Interface to efficiently perform the Interzig algorithm. Moreover, the mapping parameters of Interzig are typically matched to a particular monitor model based on the model's specific pixel structure and the microlens array design. Therefore transmitting an image in the Nine-Tile format is monitor invariant. When played back by the SynthaGram™ Player, Interzig can be turned on or off either at will or using indexing, either concealed within the image itself or by means of metadata.

The present design is independent of the number of perspective views, and is likewise independent of the Microsoft tools referenced (Direct Show and Direct X). Moreover, the actual Interzig function could be replaced by another autostereogram producing algorithm and other means could be provided for switching between autostereoscopic and planar functionality. Thus while terms such as "Interzig" and "Nine-Tile" are used herein, it is to be understood that these represent the functions described above and are not application, configuration, or proprietary software specific and that other tools or configurations may be used to effectuate the functionality discussed.

A tool such as the Interzig mapping program may look at multiple image perspective views, such as nine image perspective views, or tiles, and performs a mapping function, described above, in real time. The mapping function works in concert with a particular specific lens sheet. The particular microlens array beneficially optimizes the autostereoscopic effect based on parameters of pitch, focal length, and Winnek angle, $\omega$. The Winnek angle is defined as the angle between the lenticular "boundary axes" and the vertical edge of the display. The term "lenticular axis" is frequently employed in place of boundary axes. The boundary axes are formed by the lines of intersection of the arcs of the abutting cylindrical lenslets. Hence, the axes form a series of parallel lines. The pitch of the semi-cylindrical lenslets is defined in a direction perpendicular to the boundary axes and is given as the distance between lenticular axes. In the traditional lenticular stereoscopic display, sometimes called a panoramagram, the boundary axes are parallel to the vertical edge of the display.

Once the Interzig algorithm or similar algorithm is initiated, the program performs the mapping function and an image is mapped for autostereoscopic purposes. If the user chooses to omit the mapping function, or if the code omits the mapping function, Interzig can be turned off. Once the Interzig function is disabled, no autostereoscopic processing of the received signal occurs, and the data file can be perceived as a planar image. Such planar transmission and display can occur provided that rather than presenting data in the Nine-Tile format, image information is presented in the traditional full frame single image format.

In the present design, planar resolution, modulated by the lens sheet, is functionally related to the pitch of the lens sheet, the Winnek angle, and the display's native planar resolution. The impact of the native resolution on the pass-through relationship is not insignificant, and the higher the native resolution the better the planar transmission and viewing result.

The finer the pitch, or the greater the number of lenslets per linear unit of measure, the higher the potential pass-through resolution of the device. But it is also possible, in another limiting case, to have very large lenticules, and in one limiting case the lenticule is the same width as the display. Such a lens sheet design passes through an image not compromised in terms of resolution but with an altered aspect ratio, because the horizontal focal length of the lenticule functions as a magnifier.

Designing for the optimum autostereoscopic effect may produce a conflict with the requirements for pass-through, but often this is not the case since larger lenticules tend to exacerbate diagonal anomalies called "jaggies", so the design requirements for autostereoscopic and planar results may be similar or may coincide. Another optical factor that affects pass-through is the proximity of the lens elements to the display surface, and the medium (plastic, air gap, etc.) between the lens elements and the display surface. Other aspects of the lens design, such as focal length and the related lenslet radius, may also impact the pass-through capability of the image.

Although the pass-through resolution may be specified by objective measurement, in a display system the final arbiter of image quality is the eye-brain of the viewer. Nowhere else is this subjective assessment felt more strongly than in the employment of the Winnek technique, described in U.S. Pat. No. 3,409,351, in which the lenticular axis is no longer set orthogonal to the vertical edges of the rectangular display, but rather is tipped at some angle to mitigate moiré and promote equalization of resolution in the vertical and horizontal dimensions.

The Winnek angle is employed because if the microlens array lenticular axis is orthogonal to the horizontal edge of the display the result is marked color banding due to horizontal magnification of subpixels, an effect which is undesirable. Optical moiré artifacts may also occur, which appear as wavy, screenlike, or watermark patterns in the image displayed. Such color banding precludes the usefulness of the microlens array for both autostereoscopic and planar pass-through purposes.

When the lens sheet is rotated even a small amount with respect to the underlying display, color banding is diminished and is replaced by monochrome banding of dark lines, which is also unacceptable for either autostereoscopic or planar purposes. Continued incremental rotation of the lens sheet reveals a coarse pattern, like that seen when looking through a window screen. Additional rotation reduces the coarseness of the pattern to a most acceptable level for both autostereoscopic and planar pass-through viewing. This residual or irreducible pattern is called the "primary pattern noise." The final step in adjusting the angle is to eliminate secondary pattern noise. Secondary pattern noise appears as moving moiré-like banding when moving the head in a horizontal direction. The final position most desirable position called the Winnek angle. The Winnek angle mitigates color banding and both primary and secondary pattern noise.

Also, by passing images through a blur filter, such as the blur filter in the Adobe Photoshop product, the pass-through effect or perceived resolution may be heightened. Modern video boards employ an anti-aliasing algorithm producing a similar result in which there is pixel averaging, especially for diagonal lines or edges, to promote the appearance of a smooth, continuous line. Pixel averaging can be accomplished by similar techniques—blurring or anti-aliasing. Blurring or anti-aliasing can provide the highest possible pass-through apparent or subjective sharpness or image quality in the planar mode.

Optimized resolution of the planar pass-through image is thus a function of the native resolution of the display, the pitch of the microlens array, the Winnek angle, and the employed blurring or anti-aliasing method. The pass-through resolution may be stated in terms of the traditional horizontal by vertical pixel count, or a pass-through pixel effective aggregate may be defined. For example, a pixel in the planar mode is usually made up of three rectangular sub-pixels, red green, and blue, together forming a square pixel. The lens sheet at the Winnek angle, together with its pitch, and the blurring or anti-aliasing factor, produces a new "super pixel" which is larger than the original planar pixel, and of a different shape because of the properties of the lens sheet and blurring or anti-aliasing employed. Thus, a combination of both optical and software techniques results in optimizing the pass-though quality of the planar image.

Figure 1:
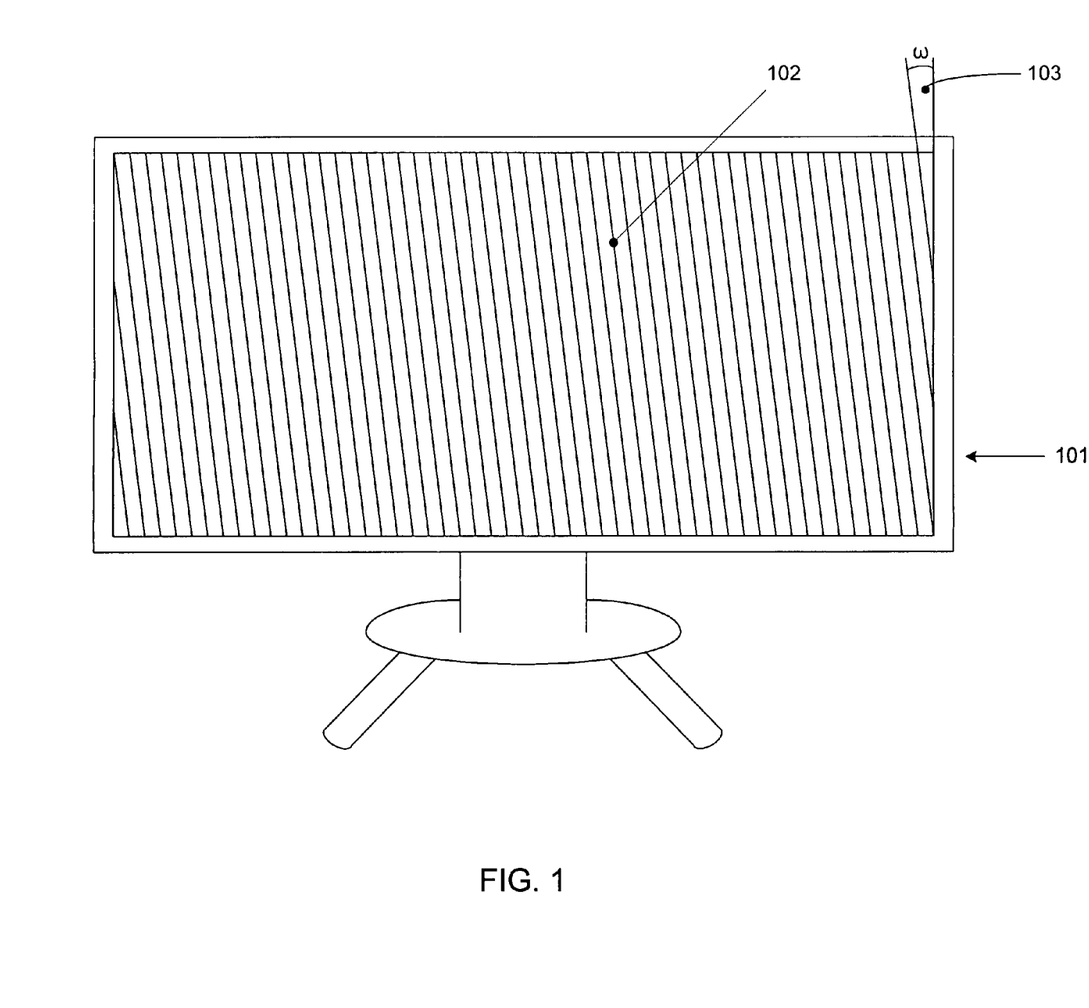
FIG. 1 shows a flat panel monitor with a microlens array mounted thereon.

FIG. 1 illustrates the StereoGraphics SynthaGram™ autostereoscopic display, including a flat panel display 101 with a microlens array 102 located thereon. The display unit consists of an array of pixels arranged such that the dots making up individual pixels can be precisely mapped, and therefore lined up with lenticular elements of the microlens array. Most current color flat-panel displays have pixels made up of red, green, and blue sub-pixel elements, as stated above. In the SynthaGram™ implementation, the lenticules of the microlens array 102 are slanted, with a Winnek angle ω 103, where the angle is measured from the vertical, here somewhere between 5 degrees and 30 degrees.

Figure 2:
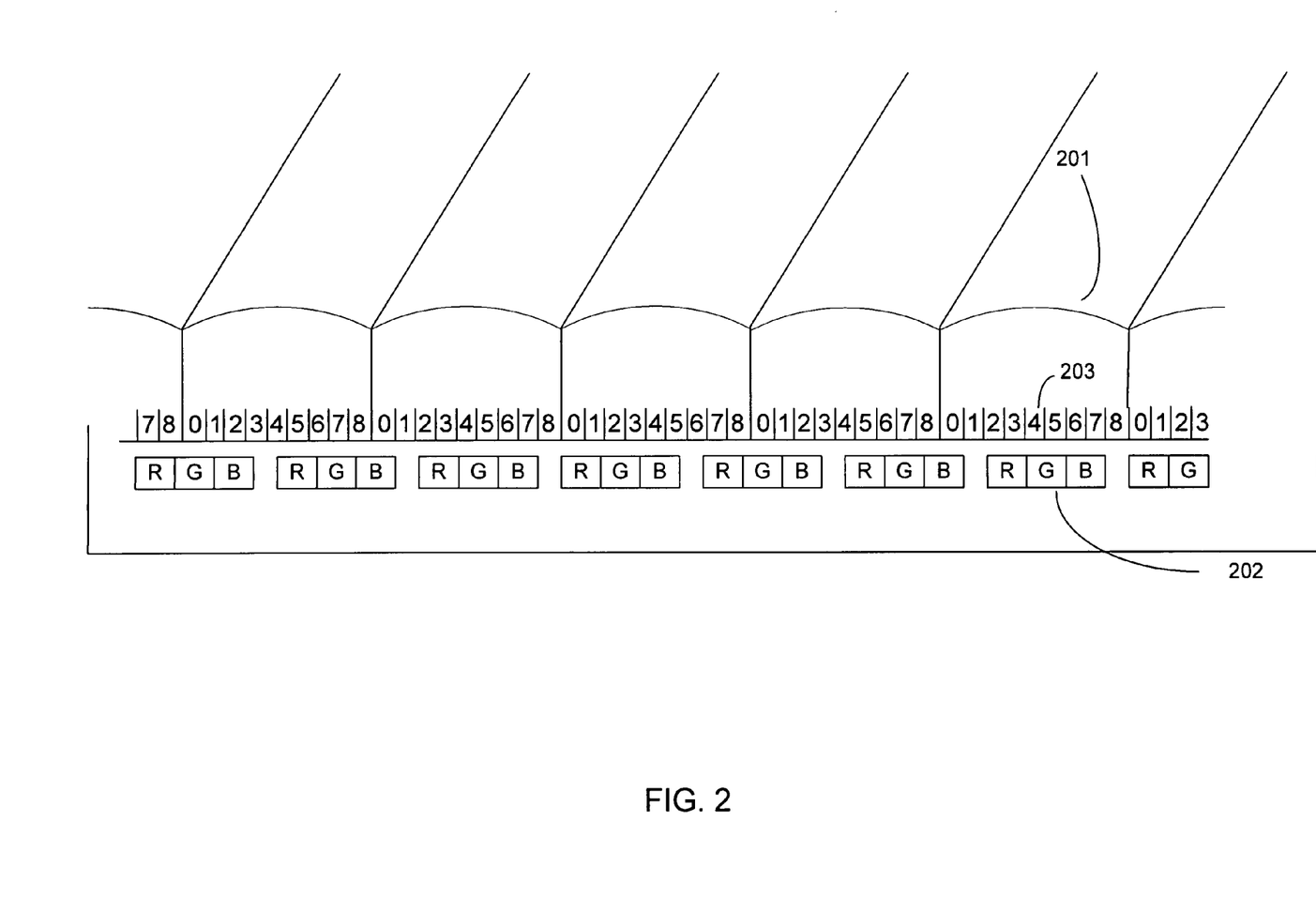
FIG. 2 shows the microlens array and its relation to the underlying display pixels.

FIG. 2 shows what is happening underneath the microlens array, in a cross-section that includes just a small portion of a single pixel row. Element 201 is one particular lenticule. This lenticule directs graphics information originating from the small portion of the display underneath that lenticule outward across a viewing zone that fans out away from the display. The display presents that graphics information as pixels 202.

The base of the particular lenticule 201 may be divided up into slices called "sub-lenticular zones" or "image stripes." Since there are multiple source-view images that form an autostereoscopic view (and precisely nine in the SynthaGram™ implementation), the base of the lenticule may be divided into that number of sub-lenticular zones, numbered 0 through 8 in the Nine-tile example. The middle sub-lenticular zone, number 4, element 203 in FIG. 2, represents the portion of the lenticule base that needs to obtain graphics content originating from the middle source-view image, half-way between maximum right-side and left-side views. StereoGraphics Interzig software causes the source-view image data presented by each individual sub-pixel to match the sub-lenticular zone that rests on top of that sub-pixel.

Figure 3:
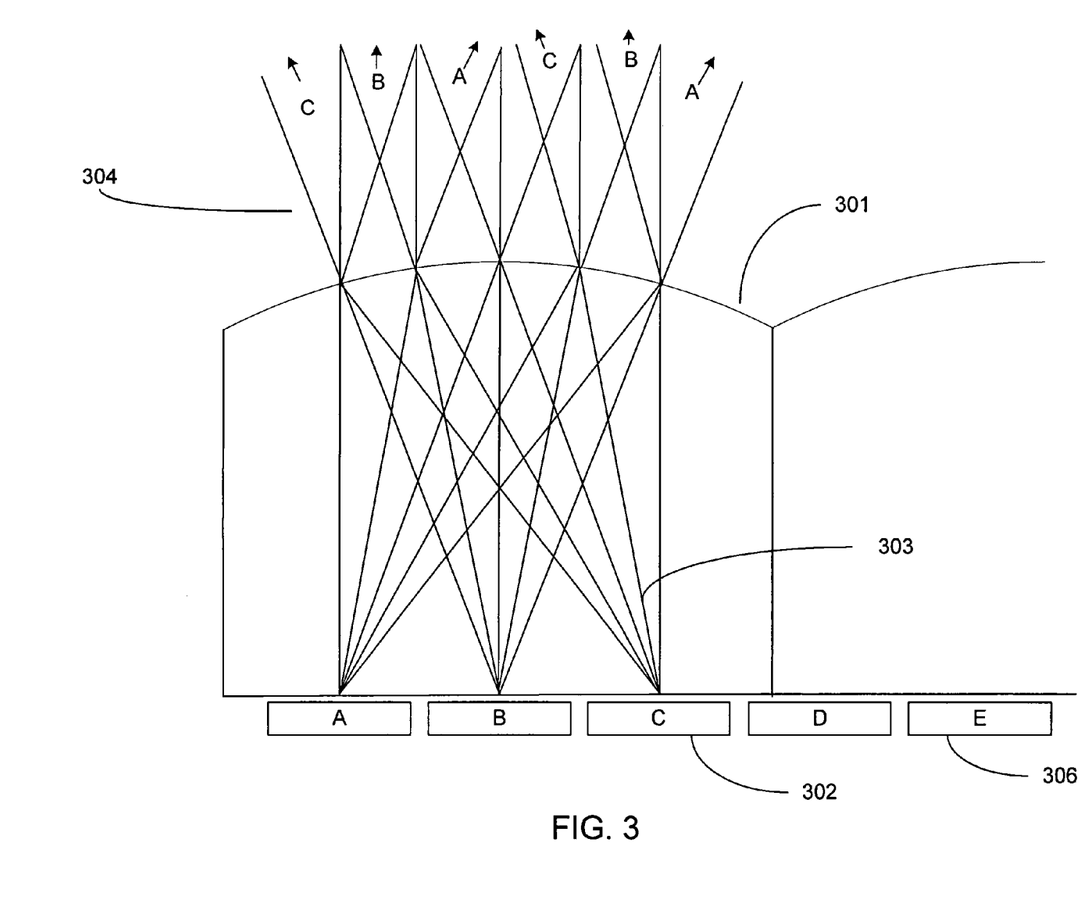
FIG. 3 illustrates the operation of a lenticular microlens, with light rays following paths from the pixels into viewing space.

FIG. 3 further illustrates how a lenticule directs pixel information out into different directions in viewing space, given that a particular pixel or sub-pixel resides under a portion of the lenticule. In FIG. 3, the lenticule 301 has three full pixels underneath as well as small pieces of two other pixels. In this example, the pixel being comprised of three sub-pixels is of no import. One pixel 302 is labeled C. The center of pixel 302 lies toward the right side of the lenticule, in the range of sub-lenticule zones that represent source views farther from center. Light rays 303 radiate within the lenticule and emerge from the lenticule, the light rays entering viewer space 304 in a general direction different from the general direction of light rays emanating from pixels A and B. Light rays coming from pixel A end up radiating rightward 305, while light rays coming from pixel C emerge from the lenticule radiating leftward. The person viewing the display will preferably be positioned such that his or her left eye views graphics information from pixel C (carrying graphics from a left-view source image), and the right eye views graphics from pixel A (with graphics from a right-view source image).

The foregoing description outlines how lenticular displays are able to convey stereoscopic imagery. It is beneficial for a single display to clearly show stereoscopic images as well as planar text and graphics. The effective display resolution for both stereoscopic and planar images are of particular concern, when such images are viewed through a microlens array to achieve the maximum planar pass-through. A microlens array somewhat matches the original native display resolution, and the present discussion will attempt to quantify an effective display resolution for the design.

The present design begins with an unslanted lens sheet having a Winnek angle of 0 degrees. The lenticules are aligned parallel to the display's pixel column, the columns being vertical-going. In this case the vertical resolution is not reduced at all, but the horizontal resolution is reduced to equal the number of lenticular elements spanning the display width (assuming that fewer lenticular elements exist than pixels per row). Thus, the effective resolution is:

$$(X/d, Y) \quad (1)$$

where (X, Y) is the native resolution, and d is the pixel density in pixels per lenticule, arrived at by dividing the pixel density per unit length by the lenticular density per unit length. Pixel density is measured horizontally and lenticular density measured perpendicular to the lenticular axis. This refers to whole pixels, not sub-pixels or dots. If X referred instead to sub-pixels and d to sub-pixels per lenticule, X/d works out to the same result.

One of the objectives of slanting the lenticules with a non-zero Winnek angle is to distribute the resolution reduction across both horizontal and vertical dimensions. With an optimal or near-optimal Winnek angle, the resolution reduction, equal to a factor of (1/d), is applied equally to both the vertical and horizontal dimensions, meaning that each dimension will have its resolution reduced by a factor of $(1/\sqrt{d})$. A high Winnek angle of 45 degrees is not needed to achieve this. Given that the subpixel density is higher horizontally than vertically, optimal settings occur at more reasonable slant angles. With the Winnek angle optimized, the effective resolution becomes:

$$\left(\frac{X}{\sqrt{d}}, \frac{Y}{\sqrt{d}}\right) \quad (2)$$

For example, if the native display resolution is 1600×1200 pixels and there are 2.5 pixels per lenticule, the effective resolution is obtained by dividing native resolution by $\sqrt{2.5}$, which is 1.58, resulting in an effective resolution of 1012× 759. Although the definition of acceptable "effective resolution" is somewhat subjective, this formula yields a reasonable approximation of useful autostereoscopic display resolution.

The display is divided up into super-pixels that make up the effective resolution. In the above example, 1012×759 super-pixels fill the display. While these super-pixels are representative, on average, of what appears as a unit of pixel data for the lenticular display, they are not actually discrete groupings of sub-pixels or dots.

The effective resolution arrived at above is a best-case result, and assumes not only that an optimum Winnek angle has been chosen, but also that the lenticular optics convey the underlying image data efficiently. For an autostereoscopic display, the most efficient application of the optical system is to accurately direct, into any given slice of viewing space, only the sub-pixel information relevant to the source-view image that should be seen in that slice of viewing space.

However, for planar viewing through a lenticular screen, best-case optical behavior is different. Every native pixel is desirably visible, or represented, for both of the user's eyes. With respect to FIG. 3, a best-case would have the person viewing the display see all of the pixels, A, B, and C, with their left eye right eyes, but the properties of the microlens, as discussed, do not permit such viewing. The best-case (given the limitation that the effective resolution is made up of super-pixels) would be for each super-pixel to display a consensus, or averaging, of the underlying native pixels, rather than a selection from the available native sub-pixels. If this best-case were realized, the effective pass-through resolution would remain:

$$\left(\frac{X}{\sqrt{d}}, \frac{Y}{\sqrt{d}}\right).$$

For the worst case, if each super-pixel is used to convey only a perfectly focused narrow selection from beneath it, the super-pixel would need to be enlarged further in order to offer a more representative sampling of the underlying pixel information. If a particular lenticule covers d pixels but is only representing one of the pixels, an adequate sampling for the planar super-pixel is d lenticules per super-pixel, or when implemented with an optimal Winnek angle, $\sqrt{d}$ lenticules per super-pixel in each dimension. Thus, the worst-case effective resolution for planar viewing through a lenticular screen is:

$$\left(\frac{X}{\sqrt{d}\sqrt{d}}, \frac{Y}{\sqrt{d}\sqrt{d}}\right)$$

or $$\left(\frac{X}{d}, \frac{Y}{d}\right).$$

To put this differently, the pass-through resolution for planar viewing is:

$$\left(\frac{X}{\sqrt{ds}}, \frac{Y}{\sqrt{ds}}\right) \quad (3)$$

where the variable s represents the sampling factor, s=1 being the best-case situation, and s=d being worst-case.

Returning to the example where the native resolution is 1600×1200 and d=2.5, the best-case planar effective resolution remains equal to the stereoscopic effective resolution, 1012×759, but the worst-case planar resolution is a rather poor 640×480. Best-case effective resolution for lenticular display planar implementations is of course preferred.

The key to approaching the best-case for planar viewing is what is termed "pixel bleed-through." Implementations of the optical model illustrated in FIG. 3 have imperfections that may be exploited for improving planar pass-through.

One example of such an imperfection is shown in FIG. 2. Toward the right of FIG. 2, a middle (green) sub-pixel 202 resides for the most part beneath sub-lenticular zone #4. The Interzig process insures that this sub-pixel carries information from the middle source-view image, and a viewer whose eye is in a middle viewing zone is presumed to see light from this particular sub-pixel. By contrast, sub-lenticular zone #5 also sits on top of a portion of that same green sub-pixel. As a result, a viewer's eye positioned in a viewing zone appropriate for seeing information from source-view image #5 will actually see at least some pixel information derived from source-view #4. This phenomenon, where some pixel information is partly misdirected to a viewing zone where it is not supposed to go is an example of bleed-through.

The bleed-through concept may apply to sub-pixels or whole pixels, depending on the context. With respect to bleed-through as it relates to stereoscopic quality, it is useful to consider bleed-through between individual sub-pixels, which carry source-view information distinct from neighboring sub-pixels. When discussing planar viewing (which most critically involves black-on-white text), bleed-through between whole pixels is more appropriate.

As illustrated above, bleed-through is most common between adjacent display elements. In the above example, a green sub-pixel bleeds through from sub-lenticular zone #4 to sub-lenticular zone #5, called first-order bleed-through. Second-order and third-order bleed-through (for example, resulting from optical aberrations in the micro-lens array) may also occur, such as where sub-lenticular zone #5 receives some information that was primarily intended for sub-lenticular zone #1.

Bleed-through, while generally undesirable for lenticular stereoscopy (though it can serve to smooth out judder between perspective views, moiré, and other pattern artifacts), can be tolerated to some extent. With planar text and graphics, however, bleed-through is a helpful attribute. Bleed-through can help spread out pixel information that would otherwise be directed selectively to narrow slices of the viewing space. Such information is now spread broadly across more of the viewing space.

For the best quality planar viewing through a microlens array, as much bleed-through as possible is beneficial (at least up to the point where the selection variable, s, can be brought down to or near a value of 1.0), particularly from sources and methods that can be selectively applied only at times when good planar viewing is desired.

Several sources of bleed-through commonly exist in a lenticular display configuration, some occurring naturally and others that can be introduced to the system.

One major source of bleed-through comes from imperfect sub-lenticular juxtaposition. Such bleed-through commonly occurs when display elements (pixels or sub-pixels) and the sub-lenticular zones that are placed above those display elements do not match perfectly. Such a phenomenon is shown in FIG. 2, where the pixels and sub-pixels 202 have boundaries that do not at all match the boundaries of the sub-lenticular zone 203.

Bleed-through from sub-lenticular juxtaposition may be quantified. If there are z sub-lenticular zones (in the Nine Tile format, z=9), and the density (pixels per lenticule) is d, all d pixel borders underneath any given lenticule may be assumed to be less than perfect, meaning that d of the z sub-lenticular zones each share (2/d) of the underlying native pixel data. Meanwhile, the other (z−d) sub-lenticular zones are left with only (1/d) of the native pixel data. Thus, on average, $$\frac{2d+(z-d)}{dz},$$

or $$\frac{d+z}{dz}$$

pixels are shared by any given sub-lenticule. The sampling factor, s, equals the reciprocal of that:

$$s = \frac{dz}{d+z} \quad (4)$$

Returning to the example where d is 2.5 and z=9, from Equation 4 s=1.96. Recalling that s=d is worst-case and s=1 is best case, this value of s, 1.96, is some improvement compared to the worst case.

From several of the above formulas, a lower density value d, representing pixels per lenticule, improves both the best-case effective resolution as well as the selection value s. Therefore, the optical design can realize increased bleed-through and improved planar viewing by decreasing the lenticule size relative to pixel size. For example, if d is reduced from 2.5 to 2.3, best-case effective resolution increases from 1012×759 to 1055×791, while the s value drops from 1.96 to 1.83, both of which will improve the effective resolution for planar viewing. Too low a density value will degrade stereoscopic quality due to insufficient discrete image views underneath each lenticule. The design can employ different lenticular pitch values to regulate the amount of bleed-through while maintaining excellent stereoscopic quality.

Figure 4:
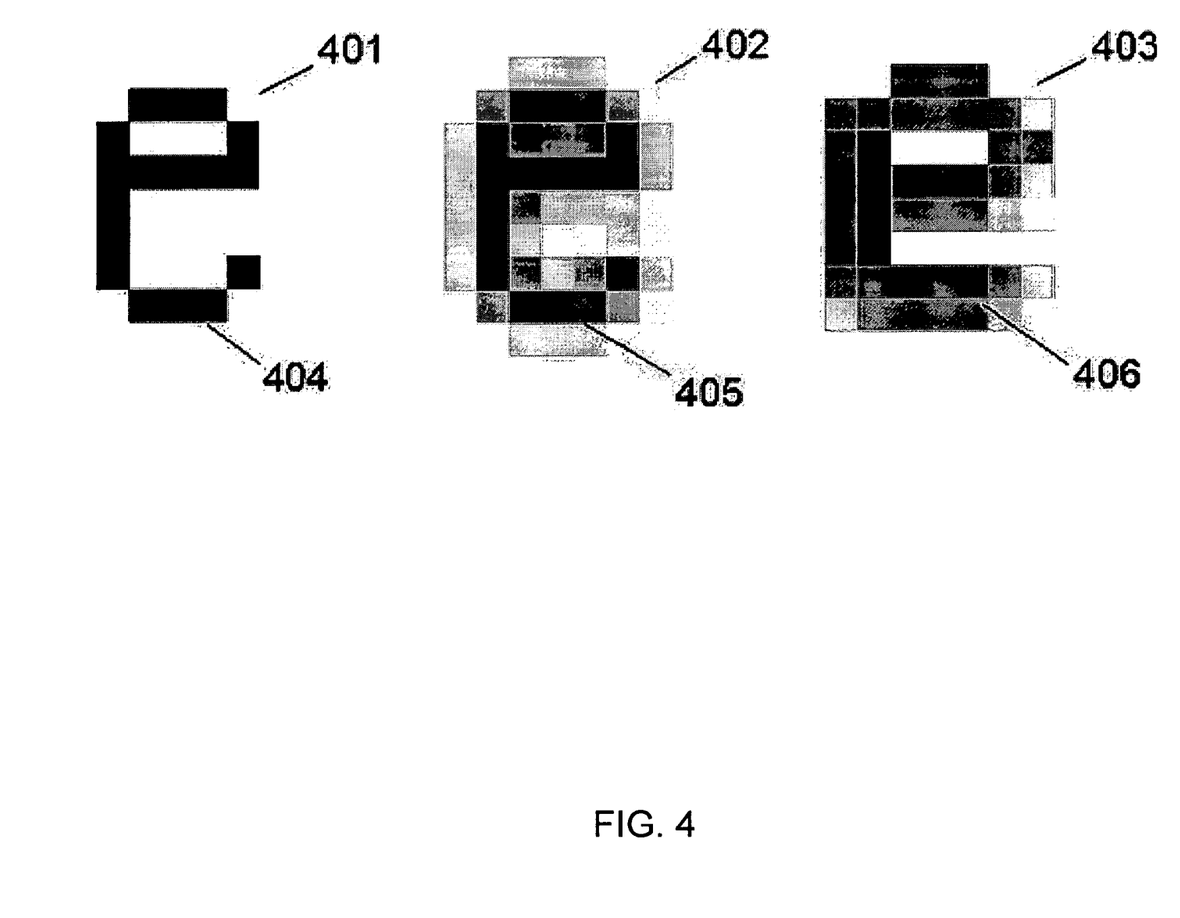
FIG. 4 illustrates the effects of digital blurring and anti-aliased scaling on a typical bitmapped alphanumeric character.

A particularly effective way to introduce bleed-through to improve planar viewing through a microlens array is to introduce blurring to the pixel data. Such blurring may be introduced by software. The system can spread out a pixel's information among neighboring pixels when the pixel's information is desired to be visible throughout all viewing zones. FIG. 4 illustrates this aspect. The system begins start with a pixel representation of the letter 'e' 401, where all elements of the letter consist of but one pixel 404. By running the letter through a low-pass (blur) filter, the result is letter 402, where the pixel data has plenty of bleed-through. The bottom stroke of the letter 'e', originally one pixel thick 404, has its information spread out between three different pixel rows 405 in the blurred (or anti-aliased) version.

With respect to adding blurring to the mathematical model, the bleed-through factor (b) represent the number of additional sub-lenticular zones. Information from one original sub-lenticular zone can be expanded to cover more viewing space. b=0 denotes no blurring, while b=1 represents blurring such that one sub-lenticule zone's information has been effectively spread between one full additional sub-lenticular zone. The b value need not be an integer, but could be any whole or fractional value greater than 0. Bearing in mind the equations used to derive s above, the d sub-lenticular zones containing pixel borders now cover (2+b) underlying pixels, while the other (z−d) sub-lenticular zones cover (1+b) pixels. Thus, the average sub-lenticular zone covers:

$$\frac{(2+b)d+(1+b)(z-d)}{dz},$$

or $$\frac{d+(1+b)z}{dz},$$

with the sampling factor once again equaling the reciprocal, $$s = \frac{dz}{d+(1+b)z} \quad (5)$$

Applying a significant blur effect of b=1.0, and with d=2.5 and z=9 once again, yields s=1.1, which approaches the best case (1.0) for effective planar resolution. If the system computes an s value less than 1.0, such a value will not help, as s=1 already realizes the best case. Based on Equation (5), an appropriate amount of digital blur can result in greatly improved monoscopic readability.

Applying a low-pass digital filter generates the blur effect shown in element 402 of FIG. 4. Bleed-through may be introduced in other ways, resulting in similar effects to the blur shown in 402. These effects can be quantified in the above formula as part of the b value.

Another effect is anti-aliasing, which is similar to blurring, but accomplished differently. Anti-aliasing is a digital averaging technique, where a graphical element that does not precisely fit the existing pixel grid is drawn using varying pixel intensities, based on how well the graphical element being drawn fits the pixel grid. For example, a black vertical line that coincides with a pixel column appears as a black pixel column, while a black vertical line that straddles two pixel columns is drawn as two adjacent medium-gray columns. With reference to the example of FIG. 4, a letter 401 whose features are one pixel thick 401 is shown. By digitally downscaling the letter and then digitally resealing the letter to its original size, the system produces an anti-aliased representation of the letter 403 whose linear features 406 are two pixels thick, effectively doubling bleed-through.

Anti-aliasing has the potential to offer a b value of up to 1.0, less than the potential b value that can be achieved from a low-pass filter, but substantial enough to greatly improve the selection value (s).

Figure 5:
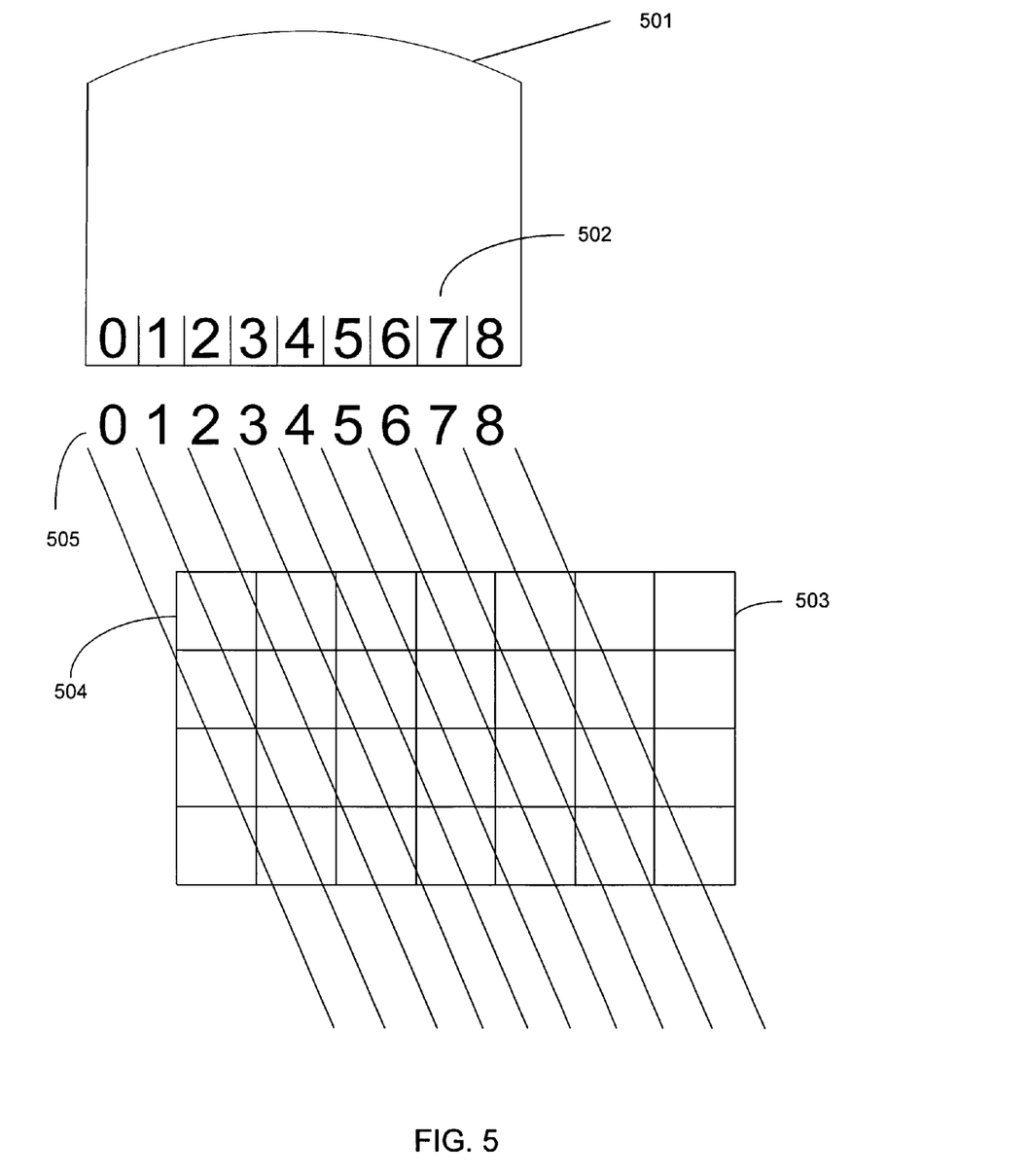
FIG. 5 shows how sub-lenticular zones, which are slanted sections of the microlens, cross a grid of display pixels.

Another source of bleed-through originates from slanting the lenticules. Compared to vertical lenticules, slanted lenticules tend to increase bleed-through. FIG. 5 presents a single lenticule 501 with its base divided up into nine sub-lenticular zones 502. A grid of pixels 503 is also shown, with four rows having six pixels per row. Square 504 represents one of the pixels in one of the four rows. The system draws the nine sub-lenticular zones 505 on top of the grid. Looking at the upper-left pixel 504, the area is partly covered by three different sub-lenticular zones. The bottom edge of this pixel includes two sub-lenticular zones. Were it not for the slant, pixel 504 might only have been covered by two sub-lenticular zones. The bleed-through value from slanted lenticules is proportional to the sine of the Winnek angle ω:

$$b = \sin \omega \quad (6)$$

Equation (6) may be modified to derive s to reflect that b is actually a combination of several b values:

$$s = \frac{dz}{d+(1+b_{combined})z} \quad (7)$$

If there are bleed-through values from several different sources, these may be combined using Equation (8):

$$b_{combined} = \sqrt{b_1^2 + b_2^2 + b_3^2 + \ldots} \quad (8)$$

To use one of many possible examples, if four different b values derive from digital blur filtering, anti-aliasing, slanted lenticules, and from optical imperfections, $$b_{combined} = \sqrt{b_{blur}^2 + b_{antialias}^2 + b_{slant}^2 + b_{optics}^2} \quad (9)$$

would be the result.

For a more specific example, assume a bleed-through value of 0.7 from anti-aliasing, and a Winnek angle of 20 degrees that yields a bleed-through value of sin(20 degrees), the combined b value is $\sqrt{(0.7)^2 + \sin^2(20°)}$, which is 0.78. Applying a b value of 0.78 to the example where d=2.5 and z=9 results in a sampling value (s) of 1.2, which approaches the best-case value of 1.0.

Such a value of (s) can be applied to the formula $$\left(\frac{X}{\sqrt{ds}}, \frac{Y}{\sqrt{ds}}\right) \quad (10)$$

to give an effective planar resolution of 924×693 (from 1600× 1200 native), not significantly worse than the calculated best-case effective resolution of $$\left(\frac{X}{\sqrt{d}}, \frac{Y}{\sqrt{d}}\right),$$

or 1012×759.

Another general source of bleed-through is imperfect optics. Numerous sources of bleed-through exist because optical elements do not behave exactly as the idealized representation in FIG. 3. Aside from the possibility of design and manufacturing defects and/or imperfect tolerances, practical considerations constrain the design to use simple single element lenses with a cylindrical arc cross-section. Additionally, light rays travel between different lenticules, causing further problems. FIG. 3 shows pixel E 306 residing under a neighboring lenticule. Inevitably, some of the light rays from pixel E cross over into lenticule 301 and exit from its curved surface, very likely in a different direction than light rays traveling out of the lenticular surface directly above pixel E. Additional optical bleed-through may occur due to refraction, and perhaps internal reflection. Such optical bleed-through may be difficult or impossible to correct.

Figure 6A:
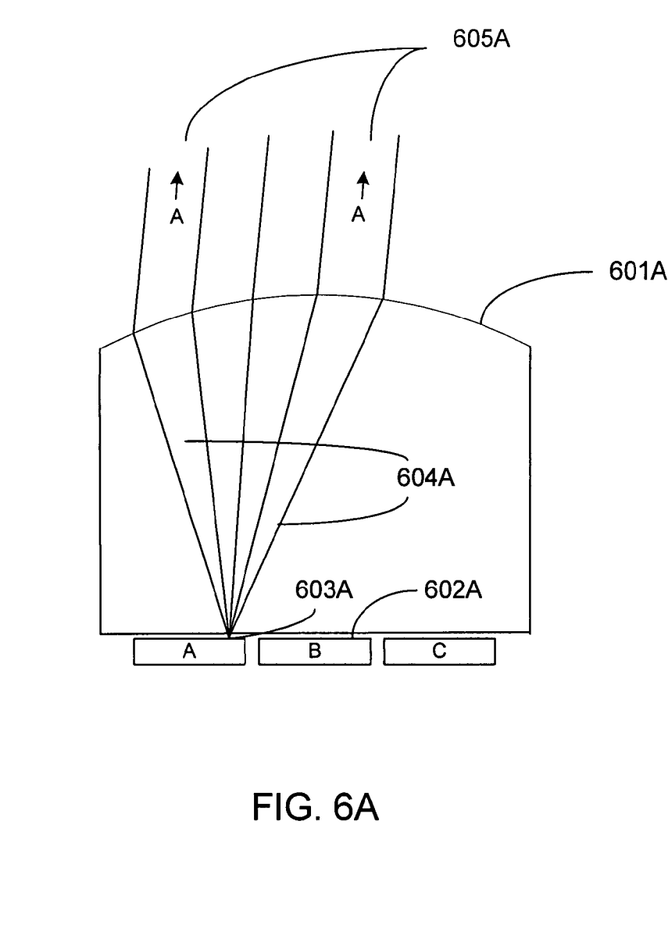
FIG. 6 demonstrates how a slight change in the optical properties of the microlens changes the nature of the image data transmitted through the microlens.
Figure 6B:
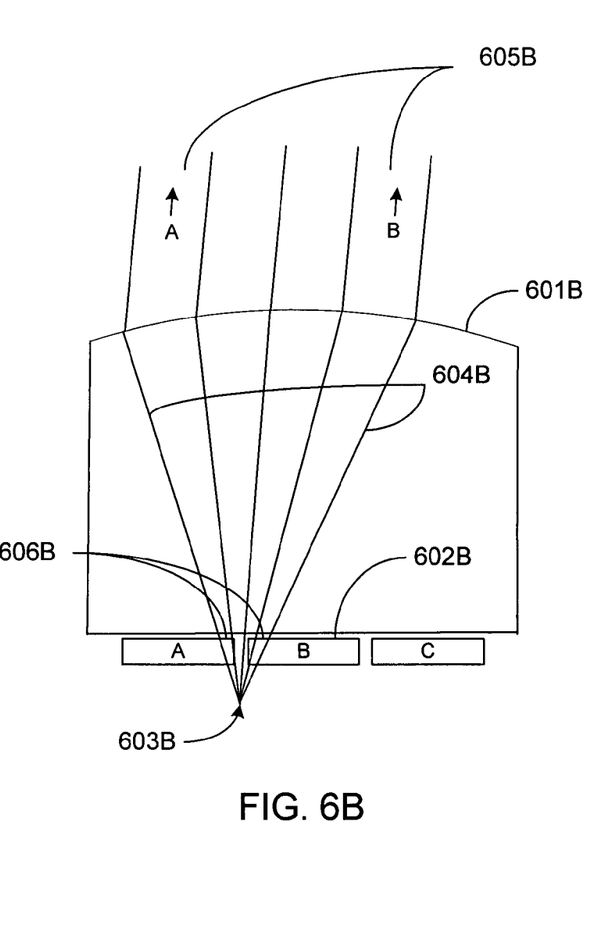

In addition to intrinsic optical imperfections, imperfections may be intentionally introduced into the design. Such imperfections may reduce artifacts (for stereoscopic and planar uses), and may also increase bleed-through for improved planar viewing. One technique is to defocus the lens elements slightly. Moving the focal plane of the lens elements behind the pixel plane, as opposed to in front of the pixel plane, can produce good results. FIG. 6 comprises two lenticule models, FIG. 6A and FIG. 6B. Each lenticule model is a single lenticule (601A and 601B) with a pixel plane (602A and 602B) beneath the lenticule. In FIG. 6A, the lenticule has its focal point 603A at the pixel plane. Following light rays 604A that start at a particular point source results in the light rays exiting the lenticule traveling in roughly the same direction 605A. A human eye positioned in a particular viewer space location will perceive graphics data coming from one particular point underneath this lenticular cross-section.

FIG. 6B offers a similar lenticule 601B to the one in FIG. 6A, except with optics that are focused 603B behind the pixel plane 602B. Starting in viewing space and following the same parallel light rays 605B back through the lenticule 604B, where the light rays converge within and underneath the lenticule, the range of light rays now overlaps portions of two different pixels 606B. The result is that the eye in viewer space sees a bleed-through of two different pixels. This bleed-through gives a greater range of sub-lenticular zone pixel data being visible from any given location in viewing space. Defocusing can be done moderately, adding some bleed-through for planar viewing (and to soften artifacts for stereoscopic viewing), without the bleed-through being so excessive to degrade stereoscopic quality.

The amount of bleed-through from various sources of optical imperfection may be quantified as different bleed-through (b) values, combined together with each other and/or with b values from other sources, using the $$b_{combined} = \sqrt{b_1^2 + b_2^2 + b_3^2 + \ldots}$$

formula, and applied to derive the sampling factor (s) using the Equations and formulas described above.

An additional technique may be used to improve planar viewing, one that does not affect stereoscopic viewing quality. Reducing the d value, which expresses the number of pixels per lenticule, not only improves the best-case effective resolution, but also reduces the sampling value (s), allowing the effective resolution to better approach the best case. The design may use a finer lenticular pitch, though this may come at the expense of stereoscopic quality. Another approach is to make the pixels larger. Even though the pixels are of a fixed size on a particular display, effective pixel size may be increased using a scaling function.

Figure 7:
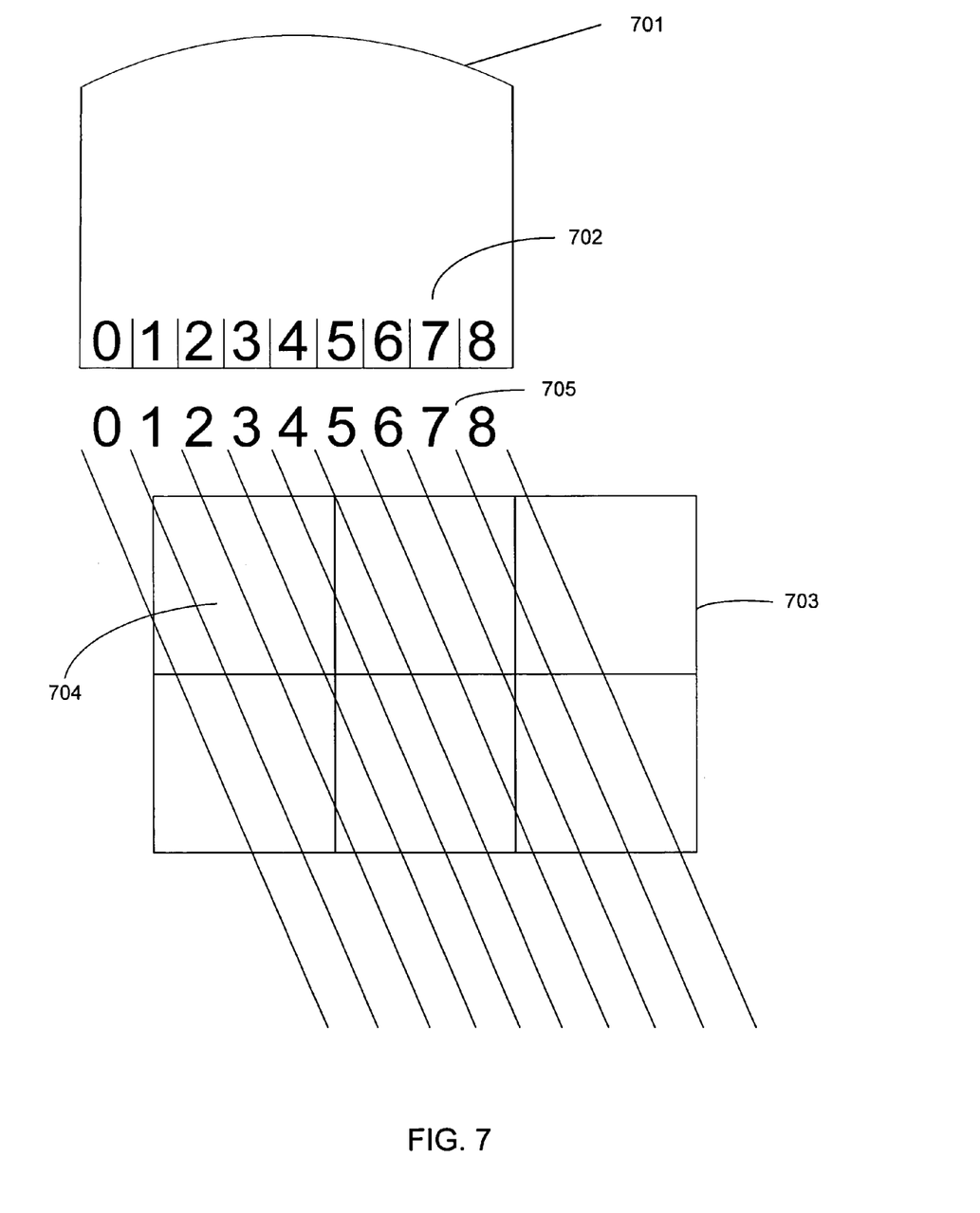
FIG. 7 is similar to FIG. 5 but shows enlarged pixels illustrating how larger pixels results in more sub-lenticular zones crossing over each pixel.

For example, FIG. 5 shows a 6×4 pixel grid section 503, where a sample pixel 504 included portions of three different sub-lenticular zones. Scaling by 200 percent, for example, in each dimension may be accomplished as shown in FIG. 7. FIG. 7 shows the same lenticular element 701 and sub-lenticular zones 702 as is presented in FIG. 5, but all of the display content has been scaled, double-sizing the pixels such that each "pixel" is made up of four original pixels. Whereas the construction originally included a 6×4 pixel grid, the device now has a 3×2 grid 703. Once again, the sub-lenticular zones 705 are drawn on top of the grid. Now, a sample "pixel" 704 spans portions of six different sub-lenticular zones, ⅔ of the total.

Any given flat panel display has a native pixel resolution, representing the actual number of full-color display elements that make up the screen. For example, a flat panel device with 1200 rows of RGB dot-groups, each row having 1600 sets of RGB sub-pixels, is said to have a native pixel resolution of 1600×1200. Recognizing that some users may have different viewing or performance preferences, video card vendors have added a scaling capability to enable a display with a native resolution to show a desktop view that has fewer than the native number of pixels.

For example, a display with a native resolution of 1600×1200 might be configured to display a 1280×960 desktop. In this case, each of the 1280 desktop "pixels" in a particular row is represented by 1.33 actual pixels. Or, put differently, each pixel, out of the 1600 in a native pixel row, covers 0.75 of the width of a desktop "pixel".

Unfortunately, such an implementation does not have the potential to improve the lenticular display's best-case effective resolution, since the microlens array remains unchanged. However, the d value in this case is changed and is used to derive s, the selection value. Therefore, using Equation (7) to derive s, $$s = \frac{dz}{d + (1 + b_{combined})z},$$

and replacing d with d/n, where n is the desktop scaling factor yields:

$$s = \frac{(d/n)z}{(d/n) + (1 + b_{combined})z} \quad (11)$$

where n is the native horizontal pixel resolution divided by the horizontal display resolution in the rescaled desktop.

The newly reduced desktop resolution puts a limit on the display's effective resolution. In other words, if the original best-case effective resolution is the native resolution with each dimension divided by $\sqrt{d}$, and the rescaled desktop resolution is less than that, the best-case effective resolution is the lesser of the two, or the rescaled desktop resolution. Thus the optimal desktop resolution, after rescaling, for planar viewing through a lenticular screen, uses the same equation that was used to calculate the best-case effective resolution:

$$\left(\frac{X}{\sqrt{d}}, \frac{Y}{\sqrt{d}}\right)$$

where (X, Y) is the display's native resolution.

For example, a 1600×1200 display with a lenticular screen having a microlens density of 2.5 pixels per lenticule has the potential to look best in planar mode if the desktop is rescaled to $$\left(\frac{1600}{\sqrt{2.5}}, \frac{1200}{\sqrt{2.5}}\right),$$

or 1012×759. If the video driver of the board employed did not offer that desktop resolution as an option it would be better to select a value on the higher side than the lower side. This is not an issue in the case of designing a dedicated device, for example, a scaling chip in a television set.

The video card and its driver perform desktop resealing to the new resolution. In order for this to occur smoothly, without the jarring effect of having some pixel rows and columns being double thick, the graphics driver applies anti-aliasing to all desktop pixel information.

Such a design implements two of the most effective bleed-through methods discussed above, anti-aliasing and scaling the original data. The scaling effectively gives a significant decrease in the number of pixels per lenticule, which increases bleed-through by letting more sub-lenticular zones share identical pixel data. The anti-aliasing effect, even with just a moderate amount of desktop scaling, adds at least one pixel in thickness to most features. Given that most on-screen text partly or entirely uses single-pixel line thickness, applying any amount of anti-aliasing will typically double the number of sub-lenticular zones carrying views of the text. Throughout this disclosure the example of text has been employed for didactic purposes. The concept applies equally well to non-alphanumeric image features.

The combination of these two bleed-through methods, along with other bleed-through sources, can result in excellent readability and overall improvements in pass-through when a lenticular display is used with planar content.

Finally, the bleed-through effects derived from video driver enabled desktop scaling are temporary. When a user wants to go back to stereoscopic viewing, where excessive bleed-through is undesirable, returning the display to native resolution eliminates the use of these bleed-through methods.

Having a display that performs well in both planar and stereoscopic display modes, particularly one whose hardware and/or software offers an automated switch between the two modes, provides an effective device wherein graphics content can communicate to the display system whether the current content should be displayed in planar or stereoscopic mode.

Figure 8:
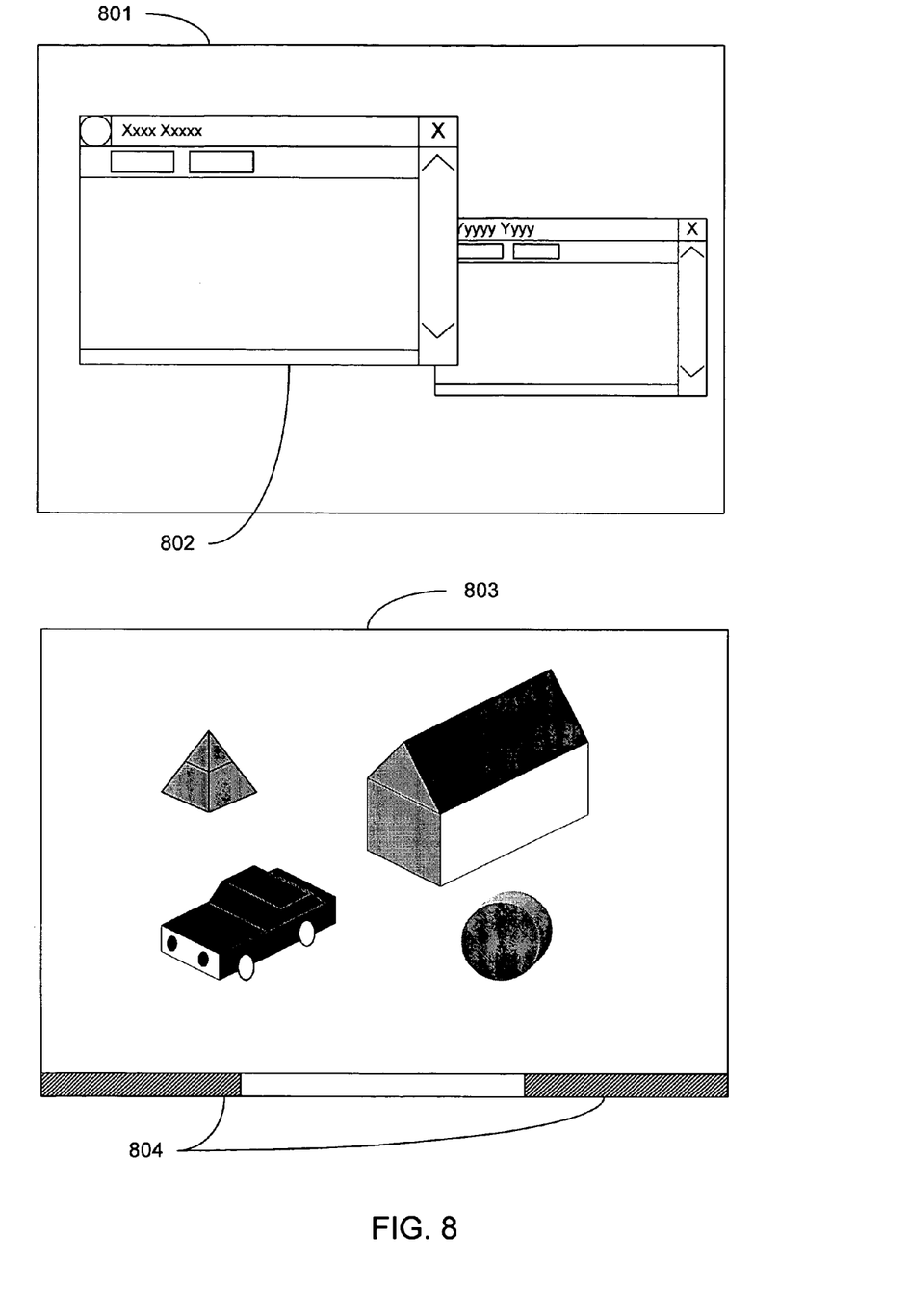
FIG. 8 shows how on-image flagging can be used to help a device or software process differentiate between planar and stereoscopic image data.

FIG. 8 demonstrates one possible implementation. On the left is a screen 801 containing typical windowed planar computer data 802, perhaps including text, file system information, and some non-stereoscopic graphics elements. On the right, another screen includes 3D imagery 803, which may be rendered stereoscopically and Interzigged for autostereoscopic viewing through the microlens array.

At least two techniques could be used to distinguish image frames that contain 3D imagery from image frames that contain 2D imagery. The first technique involves the inclusion of "meta-data" in the header information of the frame. For example, the JPEG image format defines a series of markers, which are included in the file to describe "non-pixel" information about the file. A marker could be signifying that the current file contains 3D data. These markers are typically ignored by most JPEG processing applications. A JPEG processing application may be employed that knows about the 3D data marker. Once the 3D data marker is detected, such a system interdigitates the frame before displaying the frame.

A second technique is to include a "flag" in the image portion of the frame. Such a flag allows an application processing the frame to detect that the frame contains 3D imagery. This technique is necessary because many file formats do not provide a "meta-data" area in them. Also, restrictions exist in content creation tools that limit the authoring of 3D imagery to just the pixel content. Hence a "this field contains 3D imagery flag" is a beneficial addition to the frame content.

Several attributes are needed by the flag to accomplish the desired goal. The flag is generally easily and reliably detected by an image reading application. The flag should be unobtrusive such that when the image is displayed by a "non-flag-aware" application, the image appears virtually the same as without the flag. Lastly, because the frame can be lossy compressed and uncompressed, the flag is able to detected even if slightly altered.

At the bottom of the screen in FIG. 8 is a colored zone 804. Zone 804 has three sections defining a "flag" that communicates to the graphics subsystem that the screen is to be displayed autostereoscopically. In this example, the flag is a few pixel-rows thick, and divided into three regions, one filling the left ¼ of those rows, one filling the middle ½ of the rows, and the other filling the right ¼ of the rows. The flag may be a particular color or colors, such as blue for the left and right regions, and black for the center region.

In this example, the presence of the flag indicates that the screen should be displayed autostereoscopically, and the absence of the flag indicates that the screen consists of planar content.

Detecting the flag when the field is uncompressed is a straightforward task. A brute force approach would examine each pixel in the zone for the appropriate color (e.g. RGB= (0,0,255) or RGB=(0,0,0)) and then determine that the flag is present, if all pixels in the zone were correct.

A less-conservative, but more efficient method would be to spot-check the zone, perhaps by sampling every N pixels where N is determined by dividing the width by a fixed number. For example if the image width is 1280, and N is 20, then the system checks 1280/20=64 locations on each line in the zone. A similar strategy could be used along the height of the zone. Checking just the bottom line in the zone is adequate.

If the field is compressed, a more tolerant flag-checking algorithm may be needed because a lossy compression changes the original cleanly defined flag into a flag blurred together with the surrounding image. We are presuming here standard block-like compression schemes, which are also used in most image and movie codecs.

In the currently described flag, the least blurred line is on the bottom of the zone. The bottom line of the zone is at the bottom of the image and no blurring of image data from the bottom direction can occur. Thus a flag has a height of several lines rather than a single line on the bottom. With a height of several lines, the bottom line is insulated from any surrounding blurring.

Rather than checking for an exact match of the colors, an acceptable deviation is allowed. For example rather than checking exactly for RGB=(0,0,255), a check of R less than 70, G less than 70, and B greater than 160, would suffice. Spot-checking this bottom row at 32 locations is generally adequate for reliable flag detection.

The form of the flag, or visual flag, is not important. Some kind of flag, imbedded in the screen's content, is available for indicating or flagging whether the screen content should appear in planar or stereoscopic mode. A process connected to the graphics subsystem interprets the flag or the absence thereof and switches the display driver accordingly. Alternately, a device that physically alters the display hardware may be employed. Embedding such an index function within metadata is an option with certain types of signals, for example, where the metadata function is exposed to the developer.

One possible example of such an implementation is a software function that, recognizing a switch from stereoscopic content to planar content, causes the video driver to rescale the desktop, improving planar viewing by increasing bleed-through due to the combined effects of increased pixel size and anti-aliased processing of pixel data. When the flagging indicates the need to switch back to autostereoscopic display mode, this process may be reversed.

Figure 9:
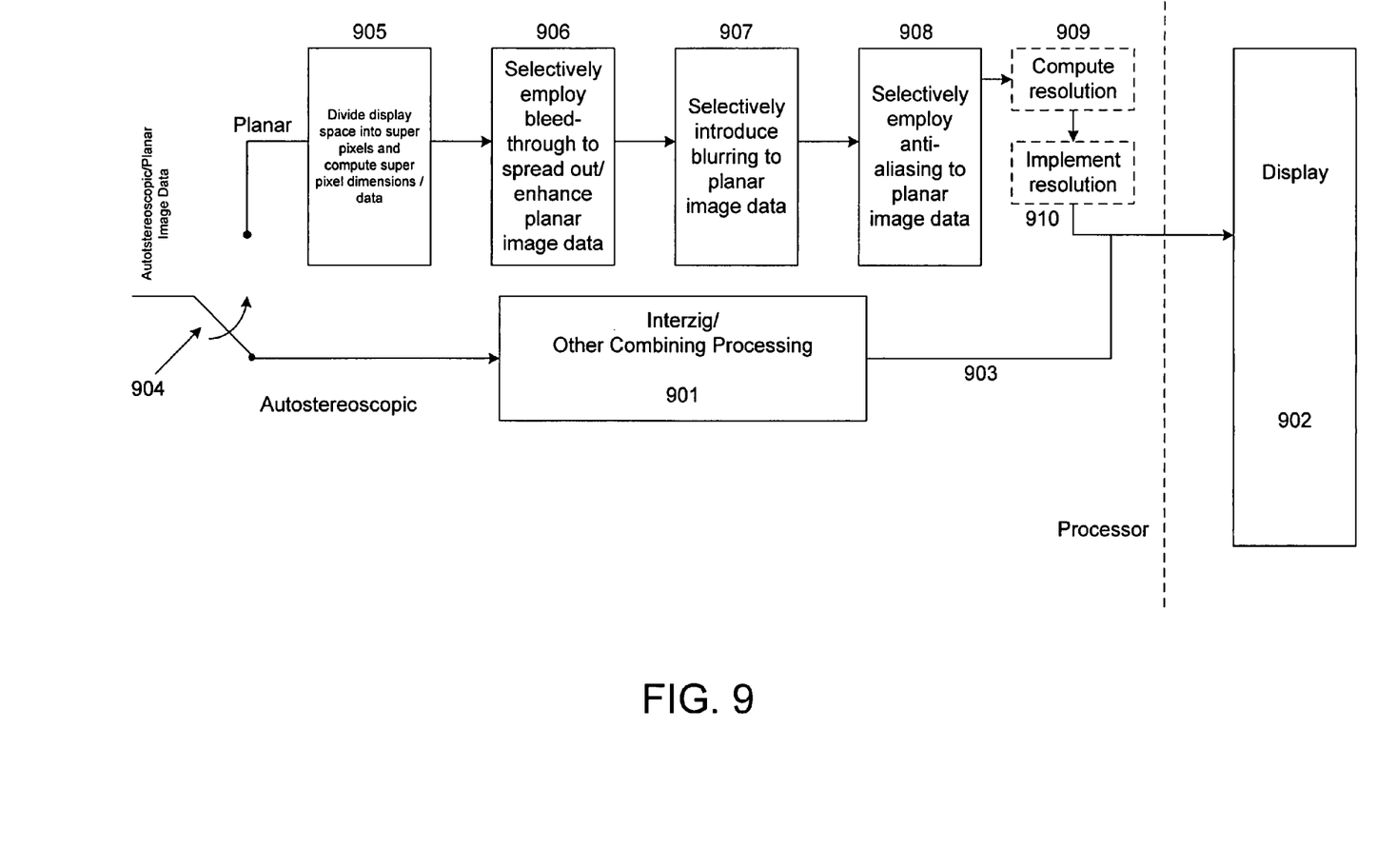
FIG. 9 illustrates a general conceptual overview of operation of the design.

A general conceptual illustration of the design is presented in FIG. 9. From FIG. 9, data is generally made available in the form of multiple views, such as nine views. The nine views are interdigitated or combined at point 901. The interdigitated views, or autostereoscopic image or images, may be fed to the display 902 via lower path 903. If a switch occurs to planar mode, either by user input, computer switching, or by the metadata or flagging mechanisms described above, the conceptual switch 904 switches to planar mode.

Prior to performing the processing shown in FIG. 9, certain physical attributes may have already been implemented. For example, the lenticule slant is a fixed mechanical display attribute, presumably provided with the display and invariant unless the display is disassembled and rebuilt, which is impractical. Thus when constructing such a display, the Winnek angle may be computed as disclosed herein, and the lenticules slanted at an angle based on the Winnek angle and depending on other circumstances described, such as pixel density. Further, based on the optics employed and the imperfection of those optics, certain bleed-through may exist that helps, harms, or does nothing to display performance. These physical factors are in place prior to the processing of FIG. 9 and may be accounted for in such processing.

In planar mode, the processing may divide the display space into a plurality of super pixels and compute super pixel dimensions and super pixel data at point 905. Point 906 reflects selectively employing bleed-through to spread out and/or enhance super pixel data. Point 907 calls for selectively introducing blurring to the super pixel data, while point 908 selectively employs anti-aliasing to the super pixel data. Point 909 computes the resolution based on the equations discussed herein, and point 910 implements the resolution, such as by a video card or other appropriate device. The resultant image is transmitted to the display, and provides a best planar image to the display based on the physical attributes and characteristics of the display.

The present design is generally hardware independent in the sense that the display processing, both autostereoscopic and planar, may occur on any general high performance computational architecture or hardware available. The display processing disclosed herein may encompass processing on a general purpose or specialized high performance computer known generally to those skilled in the art.

By the means discussed here we have described technology for creating the best possible autostereoscopic display with maximized pass-through in the planar mode using a combination of technologies suitable for a wide variety of display applications such as computer graphics for the desktop, digital signage for advertising, or for a home television appliance.

The design presented herein and the specific aspects illustrated are meant not to be limiting, but may include alternate components while still incorporating the teachings and benefits of the invention, namely the autostereoscopic display system with planar pass-through. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A method for presenting both autostereoscopic images and planar images in a single display, comprising: processing the planar images received in the form of planar image data to generate processed planar image data, wherein processing the planar images comprises at least one from a group comprising: selectively employing bleed-through processing to enhance the planar image data when viewed through a lens sheet comprising slanted lenticules; selectively introducing blurring into the planar image data; and selectively employing anti-alias processing to the planar image data; wherein the processed planar image data is in a form to be presented as two-dimensional images in a planar viewing mode of the display.

2. The method of claim 1, further comprising employing a mode switch indicator comprising one from a group comprising:
   Metadata indicating mode switching is desired; and
   a visible flag indicating mode switching is desired;
   wherein employing the mode switch indicator causes switching between autostereoscopic and planar display modes.

3. The method of claim 1, further comprising:
   computing overall resolution of data received; and
   implementing the resolution computed for displaying on the display;
   wherein said computing and implementing occur subsequent to said planar image processing.

4. The method of claim 1, wherein said selectively introducing blurring comprises lowpass filtering the image data.

5. The method of claim 1, wherein said processing comprises:
   initially dividing display space for the display into a plurality of super pixels;
   computing super pixel dimensions; and
   computing planar image data based on super pixel dimensions.

6. The method of claim 1, further comprising at least one from a group comprising:
   computing a Winnek angle for lenticules to be employed with the display; and
   computing lenticule slant differing from the Winnek angle for lenticules to be employed with the display;
   wherein Winnek angle computing and lenticule slant computing occur before said processing, and said processing accounts for Winnek angle and lenticule slant.

7. The method of claim 6, wherein said processing accounts for bleed-through resulting from imperfect optics employed with lenticules used with the display.

8. A system for providing autostereoscopic images and planar images, comprising: a display configured to receive autostereoscopic and planar images; a lens sheet positioned proximate the display comprising a plurality of lenticules slanted at an angle from vertical; and a processor configured to process the planar images received in the form of planar image data to generate processed planar image data, said processor configured to perform at least one from a group comprising: selectively employ bleed-through processing to enhance the planar image data when viewed through the lens sheet; selectively introduce blurring into the planar image data; and selectively employ anti-alias processing to the planar image data; wherein the processed planar image data is in a form to be presented as two-dimensional images in a planar viewing mode of the display.

9. The system of claim 8, wherein the processor is further configured to employ a mode switch indicator comprising one from a group comprising:
   Metadata indicating mode switching is desired; and
   a visible flag indicating mode switching is desired;
   wherein employing the mode switch indicator causes switching between autostereoscopic and planar display modes.

10. The system of claim 8, wherein the processor is further configured to compute overall resolution of data received, and the system further comprises computer hardware configured to implement the resolution computed for displaying on the display.

11. The system of claim 8, wherein said selectively introducing blurring comprises lowpass filtering the image data.

12. The system of claim 8, wherein the processor is further configured to:
   initially divide display space for the display into a plurality of super pixels;
   compute super pixel dimensions; and
   compute planar image data based on super pixel dimensions.

13. The system of claim 8, wherein lenticule slant for the lens sheet comprises computing a Winnek angle for the lenticules and computing any lenticule slant differing from the Winnek angle based on planar image characteristics.

14. The system of claim 13, wherein the processor is further configured to account for bleed-through resulting from imperfect optics employed with lenticules used with the display.

15. A method for displaying autostereoscopic images in an autostereoscopic mode and planar images in a planar mode of a display, comprising: computing a set of initial parameters based on physical characteristics of a lens sheet employed with the display; and processing the planar images received in the form of planar image data to generate processed planar image data, said processing comprising at least one from a group comprising: selectively employing bleed-through processing to enhance the planar image data when viewed through the lens sheet; selectively introducing blurring into the planar image data; and selectively employing anti-alias processing to the planar image data; wherein the processed planar image data is in a form to be presented as two-dimensional images in a planar viewing mode of the display.

16. The method of claim 15, wherein said bleed-through processing comprises spreading out pixel information among neighboring pixels.

17. The method of claim 15, wherein blurring comprises spreading out a pixel's information among neighboring pixels when the pixel's information is to be visible throughout all viewing zones.

18. The method of claim 16, wherein anti-alias processing comprises digitally averaging planar image data.

19. The method of claim 18, wherein digitally averaging comprises drawing a graphical element that does not precisely fit an existing pixel grid using varying pixel intensities based on how well the graphical element being drawn fits the pixel grid.

* * * * *